United States Patent
Massey (10) Patent No.: US 7,293,922 B2
(45) Date of Patent: Nov. 13, 2007

(54) NON-MECHANICAL ADJUSTMENT OF AN OPTICAL FIBER TO AN OPTICAL OUTPUT PORT

(75) Inventor: Brian Massey, Marlborough, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 204 days.

(21) Appl. No.: 10/858,894

(22) Filed: Jun. 2, 2004

(65) Prior Publication Data

US 2005/0271332 A1 Dec. 8, 2005

(51) Int. Cl.
*G02B 6/36* (2006.01)
*G02B 6/42* (2006.01)

(52) U.S. Cl. .......................................... 385/91; 385/52

(58) Field of Classification Search .................. 385/52, 385/88–94
See application file for complete search history.

(56) References Cited

U.S. PATENT DOCUMENTS

| | | | |
|---|---|---|---|
| 4,807,956 A | 2/1989 | Tournereau et al. .......... 385/91 |
| 4,946,246 A * | 8/1990 | Shiga ........................... 385/52 |
| 6,146,025 A | 11/2000 | Abbink et al. ................. 385/88 |
| 6,758,610 B2* | 7/2004 | Ziari et al. ..................... 385/92 |
| 6,846,113 B2* | 1/2005 | Yeh et al. ...................... 385/88 |
| 7,021,838 B2* | 4/2006 | Massey ......................... 385/91 |
| 2004/0091217 A1* | 5/2004 | Nawae et al. ................. 385/92 |

* cited by examiner

*Primary Examiner*—Tina M. Wong
(74) *Attorney, Agent, or Firm*—RatnerPrestia (57) ABSTRACT

A method of adjusting the attachment of an optical fiber to a laser diode chip within a butterfly package, or any equivalent package, identifies the location of the solder attachment on the optical fiber, thereby moving one or more high power lasers so that their respective beams are incident on the solder attachment. Then, with the application of high power laser pulses according to a predetermined pulse schedule, the solder attachment is heated so that the optical fiber may shift vertically therein. By using an internal or external monitoring means such as an optical power meter, a determination is made when the optical alignment has reached a desired threshold such as when it exceeds a desired optical power output. The pulse schedule may be performed multiple times until a substantially optimized coupling is achieved for the final package.

21 Claims, 6 Drawing Sheets

NON-MECHANICAL ADJUSTMENT OF AN OPTICAL FIBER TO AN OPTICAL OUTPUT PORT

TECHNICAL FIELD

The present invention relates generally to fiber-coupled optical assemblies and, more particularly, to a method of non-mechanically optimizing alignment of an optical fiber to an optical output port in a butterfly package.

BACKGROUND OF THE INVENTION

The importance of achieving accurate mutual alignment of individual components in any optical system is well known. The miniature dimensions of components used in modern optical communication systems render such alignment difficult both to achieve and to maintain. For example, one problem in the construction of laser transmitters is that of efficiently coupling the optical output from a laser diode into an optical fiber. To obtain efficient coupling, the fiber end is desirably precisely aligned with the emitting area of the laser. When such alignment is achieved, the fiber is then fixed in place, ideally by a method that ensures alignment is sustained throughout the device lifetime.

Typically, fiber-coupled diode lasers are packaged in gold plated metal butterfly packages and the fiber is held in alignment with the laser using either epoxy, laser weld, or solder attachment techniques with or without a ferrule. Epoxy attachment is low cost but may have too much thermal expansion for high precision attachments. Furthermore, it is not reliable over a long period of time due to outgassing and alignment shifts arising from aging and temperature cycling. Laser weld techniques are reliable but require costly ferrulization of the fiber and specially designed mounts or clips to allow weld attachment of the ferrulized fiber. The mounts/clips are expensive, large, and may creep over time. Solder attachment techniques, on the other hand, are reliable and low cost, and have become prevalent in the art. However, existing solder attachment techniques tend to use either an integrated heating mechanism and/or a specially configured platform to isolate the heat for a solder reflow. These tend to be expensive and undesirably large.

The mounting point at which the fiber is soldered desirably has specific material properties in order to work effectively. An acceptable material for the mounting point desirably has a low thermal conductivity (e.g. less than 50 W/m-K) and a thermal expansion coefficient that maintains fiber alignment while the package is heated. The exact thermal expansion property desired may depend on the material to which the laser is mounted, the respective thickness of the fiber mount and laser submount, and/or the temperature profiles expected during operation. The fiber mount material also may be able to be soldered or be able to be plated with a solderable material. During the soldering process, the fiber mount may experience significant stress resulting from differential expansion due to temperature gradients and materials differences. Therefore, the fiber mount desirably has a high tensile strength (e.g. greater than 25 kpsi) to avoid fracturing.

Figure 1:
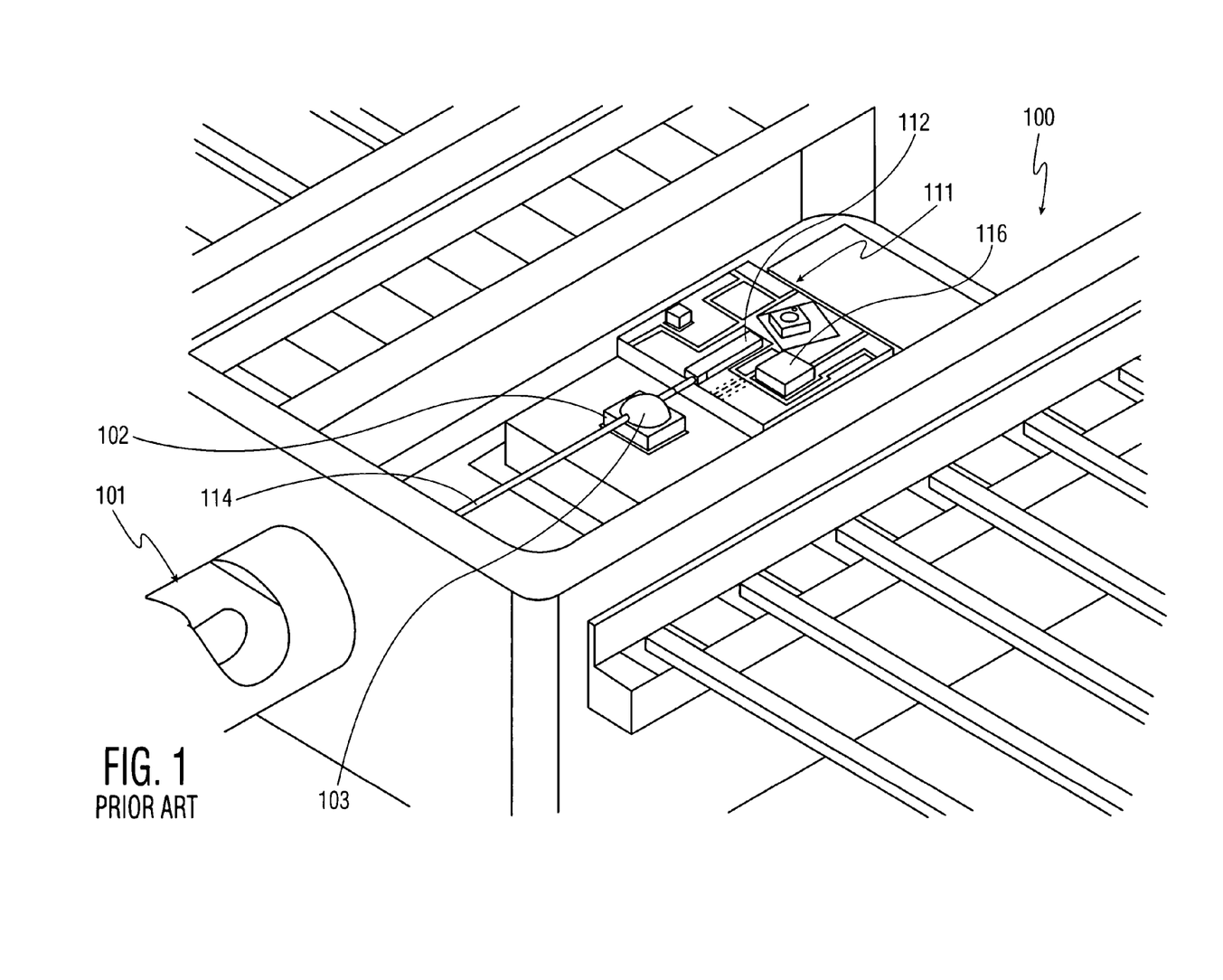
FIG. 1 is a perspective view of a fiber-coupled optical component package showing the snout feed-through for an optical fiber and the optical fiber soldered to a separate mount component within the package, according to the prior art.

It is difficult, however, to maintain alignment between the optical component and the fiber when the fiber soldered due to turbulent flows and capillary forces exhibited by the molten solder. For example, the prior art package shown in FIG. 1 is a butterfly package 100, where optical fiber 114 is inserted into fiber feed-through 101 and attached to fiber mount 102 with solder attachment 103 so as to obtain a desirable alignment with laser diode chip 112. However, in such a package, the reflowing of solder attachment 103 creates the above mentioned turbulent flows and capillary forces, thereby causing a misalignment between optical fiber 114 and laser diode chip 112 resulting in an undesirable alignment quality therein. Currently, post soldering adjustments are made to correct this misalignment by physically contacting the optical fiber and/or bending the attachment beyond its yield point, undesirably resulting in permanent deformation. Such methods of physically adjusting the alignment may introduce further stresses, causing the optical fiber to creep over time. Other methods of post-solder adjustments may include the undesirable addition of costly and complicated tooling (e.g., grippers) and high precision linear or rotary stages.

SUMMARY OF THE INVENTION

The present invention is embodied in a method of aligning an optical fiber attached to a mount pad by a heat sensitive attachment to an adjacent optical source having an optical output port by activating the optical source to emit a signal from the optical output port, aligning a plurality of high-power lasers such that their respective beams are incident on the heat sensitive attachment, activating the plurality of high-power lasers to apply their respective beams on the heat sensitive attachment according to a predetermined pulse schedule, thereby adjusting the fiber at least vertically toward a desired position, activating an optical power meter to obtain a measure of alignment quality between the optical fiber and the optical output port, and repeating until the measure of alignment quality is greater than a predetermined threshold.

In a further embodiment, high-power laser alignment may be achieved by visually aligning the heat sensitive attachment with respect to the plurality of high-power lasers to align the heat sensitive attachment to the plurality of high-power laser beams. In an alternate embodiment, such alignment may be achieved by moving the plurality of high-power lasers to a predetermined position with respect to the heat sensitive attachment. In another alternate embodiment, high-power laser alignment may be achieved by activating a camera system to identify a location of the heat sensitive attachment with respect to the plurality of high-power lasers, and moving the plurality of high-power lasers with respect to the heat sensitive attachment to align the beams of the high-power lasers to the location of the heat sensitive attachment.

In a further embodiment, the predetermined pulse schedule activates the plurality of high-power lasers to emit 5-8 bursts of 10-14 pulses of optical energy each a pause in between each respective burst of between 170 and 280 milliseconds, each pulse having 10-22 watt pulse power and a pulse width of approximately 22 to 38 milliseconds.

In another embodiment of the invention, a method of aligning an optical fiber to an optical output port providing an optical signal from an optical source comprises the steps of providing the optical fiber adjacent to the optical output port, the optical fiber being attached to a mount pad with a heat sensitive attachment, activating a localized pulsed heating means over the heat-sensitive attachment according to a predetermined pulse schedule to cause a vertical shift of the fiber, monitoring optical coupling efficiency with a power meter, and repeating as necessary to obtain a predetermined coupling efficiency.

In an alternate embodiment of the present invention, a method of thermally adjusting an attachment of an optical fiber to a laser diode chip inside a butterfly package comprises the steps of placing the butterfly package on a surface cooled to a predetermined temperature, activating the laser diode chip to emit an optical signal, respectively aligning the attachment and a plurality of high power lasers so that the attachment is substantially within a meeting point of a plurality of beams of the plurality of high power lasers, activating the plurality of high power lasers to emit pulses of optical energy over the attachment, according to a predetermined pulse schedule, activating an optical power meter to obtain a measure of alignment quality between the optical fiber and the laser diode chip and repeating until the measure of alignment quality is greater than a predetermined threshold.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Referring now to the drawing, in which like reference numbers refer to like elements throughout the various figures that comprise the drawing, FIG. 1 shows a butterfly package 100 according to the prior art. The prior art package 100 includes optical fiber 114 inserted through snout feedthrough 101 and attached to fiber mount 102 with solder attachment 103. Optical fiber 114 is also optically coupled to optical component 112 (e.g. semiconductor laser, laser diode chip, photodetector) mounted on a substrate 111. Also included in the package shown in FIG. 1 is a thermistor 116. If the package includes a thermo-electric cooler (TEC) it is beneath the substrate 111.

It can be seen from FIG. 1 that optical fiber 114 is mounted on a fiber mount 102 that is separate from the substrate 111 on which optical component 112 is mounted. Furthermore, because the fiber is attached when the optical component 112 is in the package 100, the alignment process may be complicated because there is no available side view of the area where fiber 114 is to be aligned and coupled to optical component 112. Further, the insertion of fiber 114 through snout feedthrough 101 may require a non-vertical manufacturing process, which may cause complications in the manufacturing process resulting in yield issues. Additionally, optical fiber 114 is attached to fiber mount 102 by application of a drop of molten solder 103, which may result in a change in the alignment prior to attachment.

Figure 2:
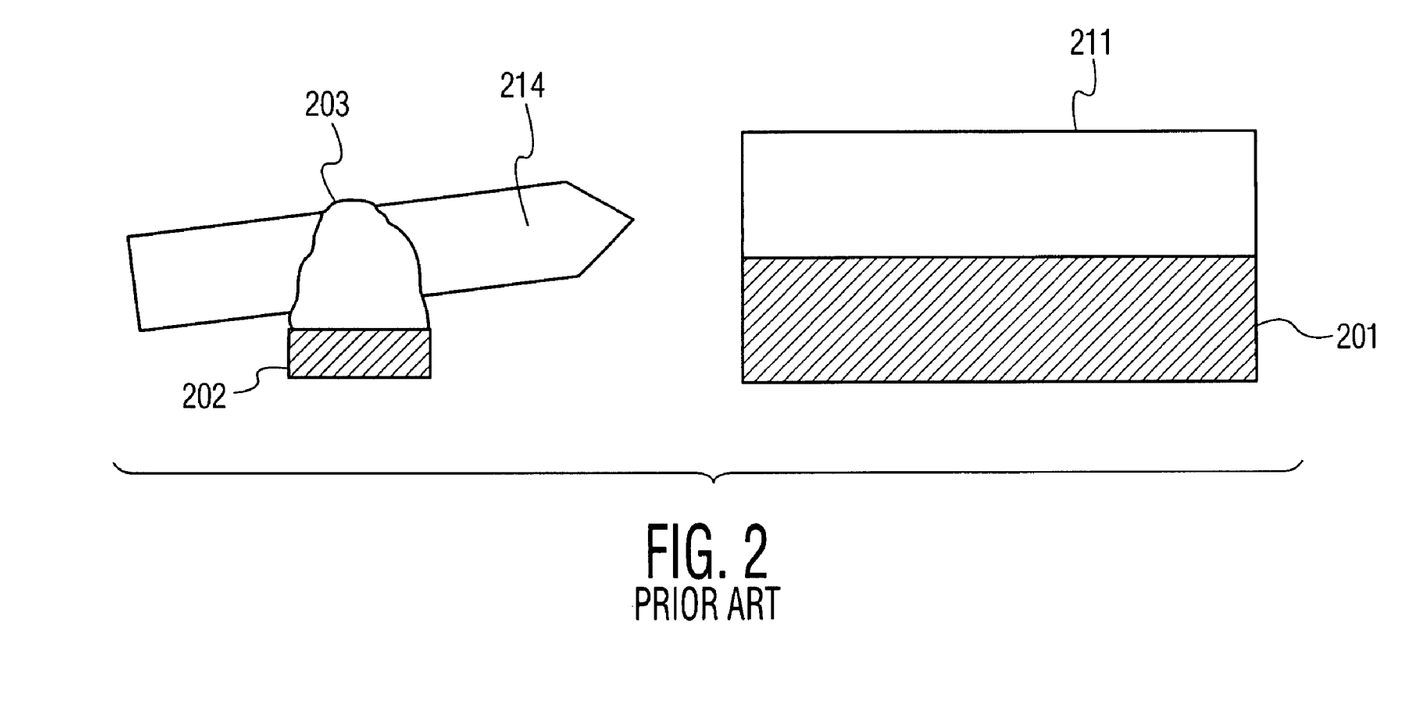
FIG. 2 is a side plan drawing of an optical fiber with vertical rotational misalignment with respect to an optical component, according to the prior art.

It can be seen that the coupling efficiency achieved by the alignment in the prior art package 100 described above may be undesirably low for high-precision optical fibers and semiconductor lasers. A side plan view is further presented in FIG. 2 to illustrate one possible type of misalignment that may occur in the prior art. In such a case, laser diode 211 is mounted on laser sub-mount 201, and is optically coupled to optical fiber 214, which is attached to fiber mount 202 with heat sensitive attachment 203 (e.g., solder). As is shown in the figure, there is an exaggerated vertical misalignment between the fiber 214 and laser diode 211, which may cause a considerable degradation of the coupled optical signal strength. Other types of misalignments that may occur may include vertical translational misalignments, for example. Those skilled in the art will recognize, therefore, that such a misalignment, if present in the laser-coupled optical fiber butterfly package 100 of FIG. 1, will be complicated to resolve without introducing additional deformations and misalignment.

A mounting system which uses the present invention addresses this problem by mounting the fiber on a mount pad that is on the same substrate as the optical component and aligning the fiber to the optical component before the substrate is soldered into the package. The heating of the substrate that occurs when it is soldered to the package may disturb the alignment between the optical fiber and the optical component. If the optical device is a single-mode laser, this misalignment may result in a loss of coupled power of as much as 80 percent. For a multi-mode laser, the coupling loss may be as much as 20 percent. The inventors have determined that this misalignment is typically a vertical misalignment and may be corrected by the methods described below.

Figure 3:
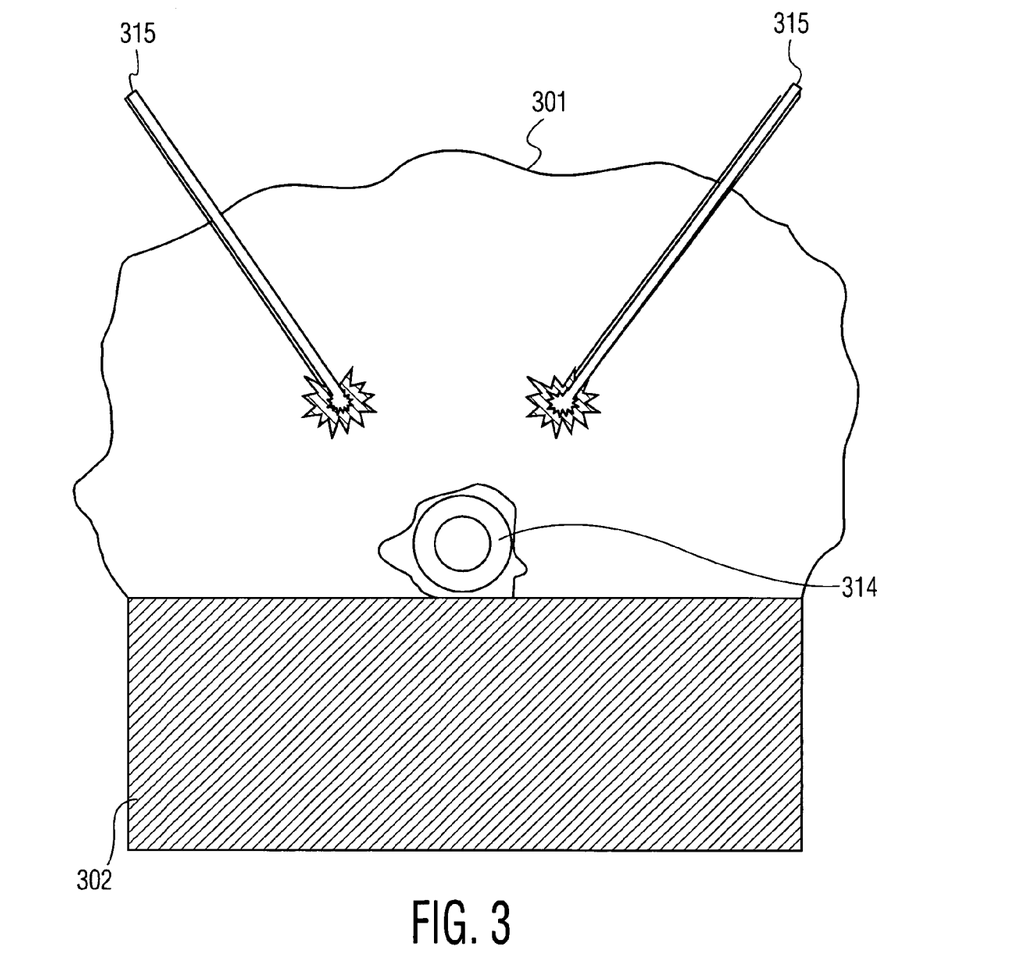
FIG. 3 is a front plan drawing of the preform in FIG. 3 with an optical fiber placed within the groove and laser radiation incident on the preform according to the present invention.

In the present invention, with respect to FIG. 3, a method is presented for aligning optical fiber 314 attached to mount pad 302 by heat sensitive attachment 301 (e.g., solder) to an adjacent optical source (not shown in FIG. 3) having an optical output port. In this embodiment of the present invention, the optical source (e.g., single mode semiconductor laser, multi-mode semiconductor laser, optical mirror, second optical fiber, semiconductor optical amplifier, optical concentrator, light-emitting diode) is activated to emit an optical signal (not shown in FIG. 3) via an output port (not shown in FIG. 3). The reception of the optical signal by optical fiber 314 may then be monitored by an optical power meter (not shown in FIG. 3) in order to obtain a measurement of alignment quality. The measurement of alignment quality may provide an indication of absolute power reception or, alternately, power reception relative to a predetermined figure. In order to correct any vertical misalignments of optical fiber 314 within heat sensitive attachment 301, one or more high power heating lasers (not shown in FIG. 3) are aligned over the package such that their respective beams 315 are incident on heat sensitive attachment 301. The one or more high power lasers are then activated to apply beams 315 on heat sensitive attachment 301 according to a predetermined pulse schedule. Such an application of pulses causes a vertical shift in optical fiber 314. The pulse schedule may then be repeated until the optical power meter indicates that alignment quality has reached or is greater than a predetermined threshold or otherwise desired value.

Those skilled in the art will recognize that the optical source having an optical output port in all embodiments of the present invention may alternately be a photo detector with an optical input port. In such an embodiment, the alignment quality of the optical fiber to the photodetector may be obtained by monitoring an output signal of the photodetector, or an output signal of circuitry coupled to the photodetector.

In a further embodiment of the present invention, the method of aligning the high power lasers to emit their respective beams over the heat sensitive attachment may include visually aligning the heat sensitive attachment with respect to the plurality of high power lasers. Such a visual alignment may be obtained manually or by activating a camera system to identify the location of the heat sensitive attachment with respect to the plurality of high-power lasers using image detection algorithms prevalent in the art, and thereby moving the high-power lasers with respect to the heat sensitive attachment to align the respective beams of the high-power lasers so that they are incident on the heat sensitive attachment.

In an alternate embodiment, a misaligned laser-coupled optical fiber package may be placed predictively in a predetermined position, so that the one or more high power lasers may be aligned by moving them to corresponding predetermined positions with respect to the heat sensitive attachment, wherein their respective beams will be incident on the heat sensitive attachment.

In a further embodiment, the predetermined pulse schedule activates the plurality of high-power lasers to emit 5-8 bursts of 10-14 pulses of optical energy each a pause in between each respective burst, each pulse having 10-22 watt pulse power and a pulse width of approximately 22 to 38 milliseconds and preferably about 30 milliseconds. The pause between respective bursts may be from 170 and 280 milliseconds and preferably about 225 milliseconds, for example.

Figure 4:
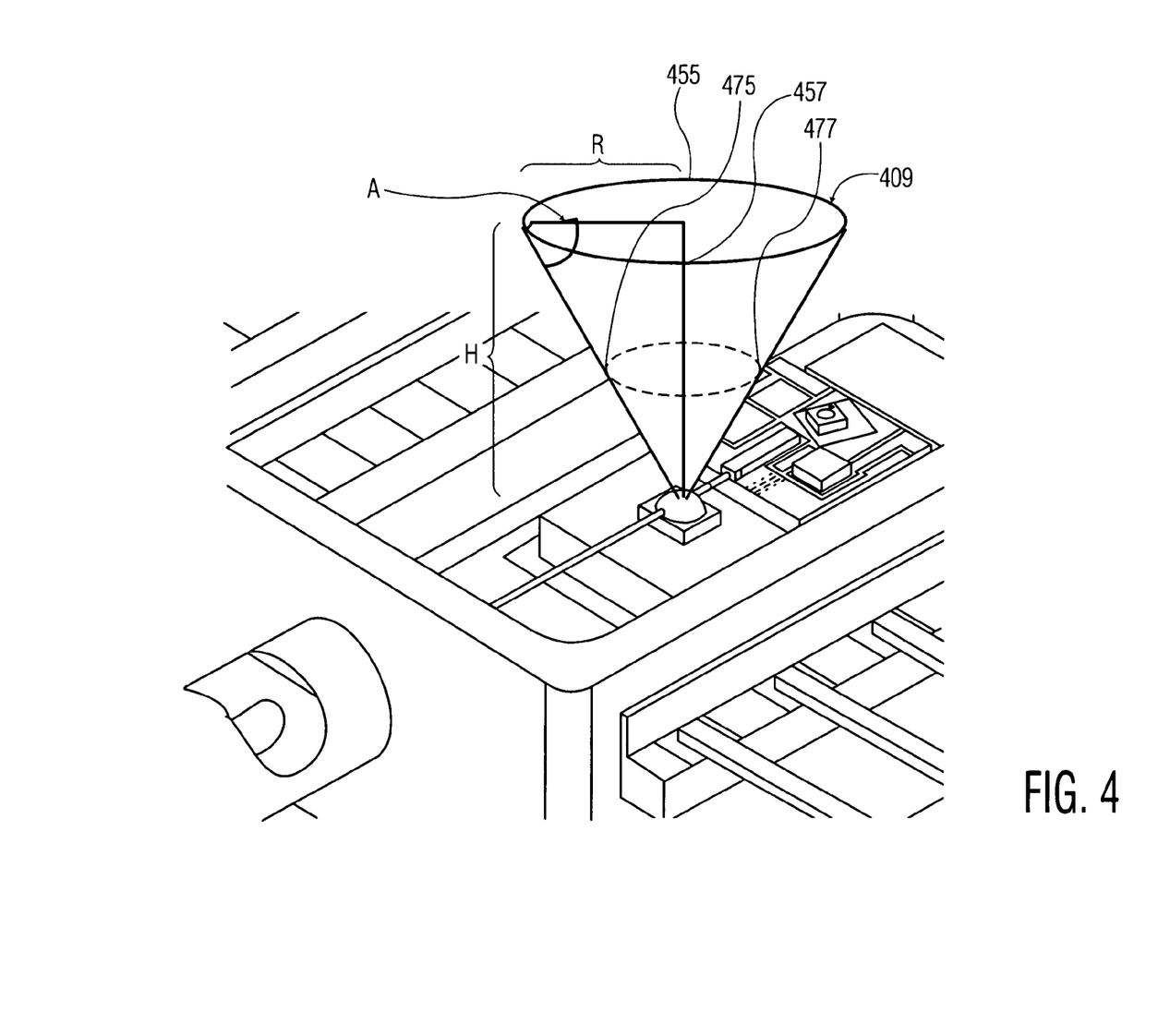
FIG. 4 is a perspective view of a fiber-coupled optical component package with a superimposed cone illustrating possible locations of high power lasers in one embodiment of the present invention.

Furthermore, in another embodiment of the invention, two high power heating lasers may be positioned symmetrically on the outer surface of cone 409, having height H, radius R, and corresponding plume angle A. High power lasers 455 and 457, for example, may be placed symmetrically on the outer edge of the cone, so that their beams are incident on the heat sensitive attachment. Alternately, high power lasers 475 and 477 may be symmetrically placed further down the outer surface. In one embodiment of the invention the laser may have a working distance of 5 cm (2 inches), plume angle A may be 60 degrees, height H may be 4.4 cm (1.73 inches), and radius A may be 2.5 cm (1 inch). Alternately, they may be positioned arbitrarily as long as their respective beams are incident on the heat sensitive attachment and provide heating of the heat sensitive attachment to 70-110 degrees Celsius, in one embodiment.

Figure 5:
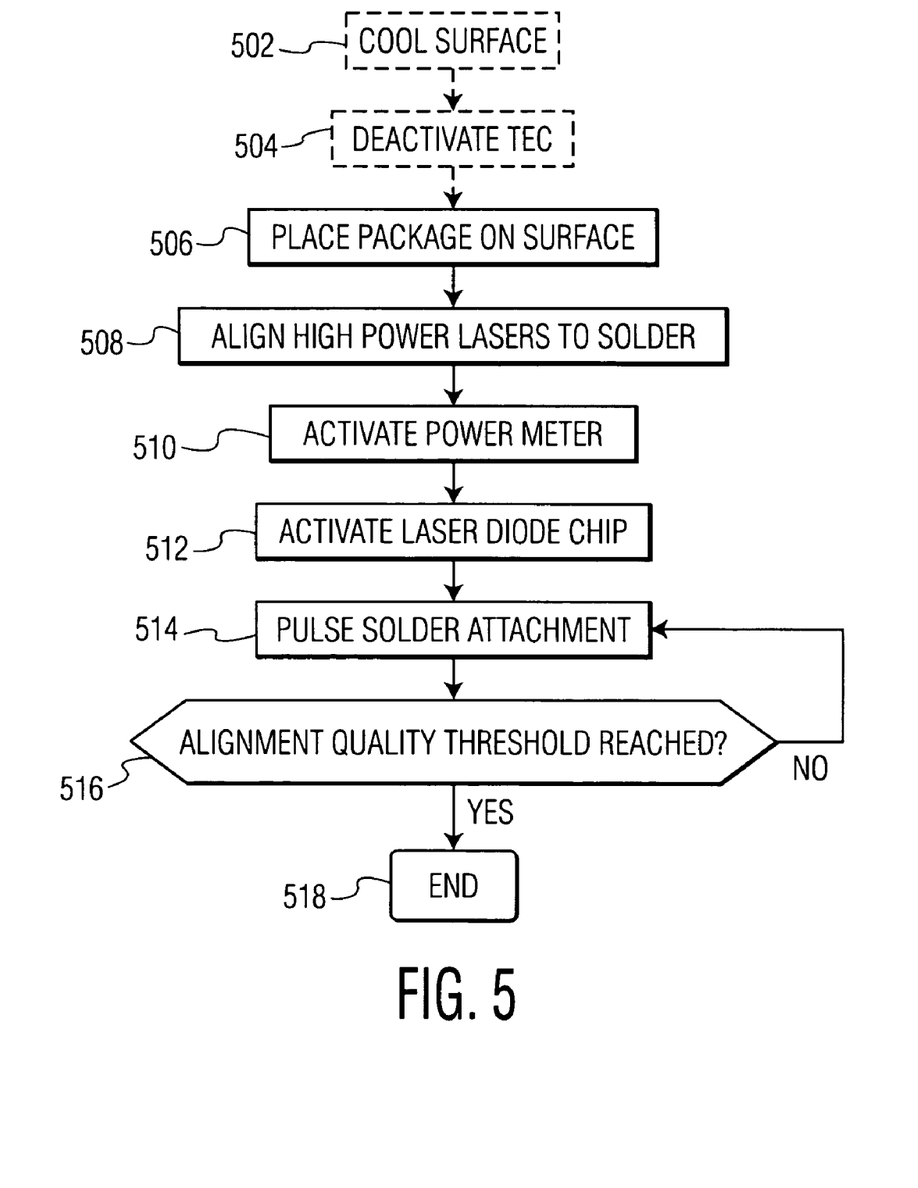
FIG. 5 is a flowchart of a method of alignment according to one embodiment of the present invention.

FIG. 5 shows a method of aligning an optical fiber to an optical output port of an optical component in a package, according to one embodiment of the present invention. In optional step 502, the surface on which the optical package is to be placed may be cooled to a predetermined desired operating temperature, which may be, for example, 20-25 degrees Celsius, so that any misalignment may be measured at that temperature. In a further optional step 504, a thermoelectric cooler (TEC) (not shown) of the optical package may be deactivated so that it does not interfere with heating in the alignment process. In this exemplary embodiment, the TEC is activated after the alignment process to determine if the optical fiber and optical component are aligned at the desired operating temperature. If it is expected that the device will operate at several different temperatures, alignment measurements may be taken at each of these temperatures to optimize the overall alignment of the optical fiber to the optical component.

Alternately, if the optical package does not include a TEC, such a step is omitted. Step 506 provides the optical package and places it on a surface—the cooled surface of step 502, if step 502 was performed. In step 508, one or more high power lasers are aligned over the optical package so that their respective optical beams are incident on a heat sensitive attachment of the optical package. Step 510 activates a power meter that receives its input from the optical fiber, and obtains measures of the alignment quality between the optical fiber and optical output port. The optical power meter may obtain alignment quality measurements continuously throughout the rest of the method, or, alternately, it may provide a measure of alignment quality upon the completion of each pulse schedule. Step 512 activates the optical component to emit an optical signal from the optical output port. In general, steps 508-512 may be performed in any order. Step 514 activates the one or more high power lasers to emit pulses of optical energy on the heat sensitive attachment according to a predetermined pulse schedule. In one embodiment, the predetermined pulse schedule activates the plurality of high-power lasers to emit 5-8 bursts of 10-14 pulses of optical energy each with a 170 to 280 millisecond pause, and preferably a 225 millisecond pause, between each respective burst and each pulse having 10-22 watt pulse power and a pulse width of between 22-38 milliseconds and preferably about 30 milliseconds. The temperature of the package may be monitored to control the application of laser energy so that the package reaches a desired temperature range but does not exceed it. In the exemplary embodiment of the invention, the temperature of the package may be measured using a temperature measuring device such as a thermometer, thermocouple, thermistor or other such device. For devices that include thermo-electric coolers (TECs), this temperature range may be, for example, 90-110 degrees Celsius. For devices without TECs the range may be, for example, 70-90 degrees Celsius. In step 516, a determination is made whether the alignment quality observed by the optical power meter is greater than or equal to a desired threshold value. If it is not, the method proceeds to step 514, where the pulse schedule is repeated. Once the alignment quality threshold is reached, the method ends in step 518.

In an alternate embodiment of the present invention, the predetermined pulse schedule that is repeatedly applied to achieve desirable alignment of the optical fiber and output port may comprise a plurality of predetermined pulse schedules, wherein the process applies a predetermined pulse schedule corresponding to a current measure of alignment quality. The process may, therefore, apply a different predetermined pulse schedule for each measure of alignment quality, or each range of values of alignment quality.

Figure 6:
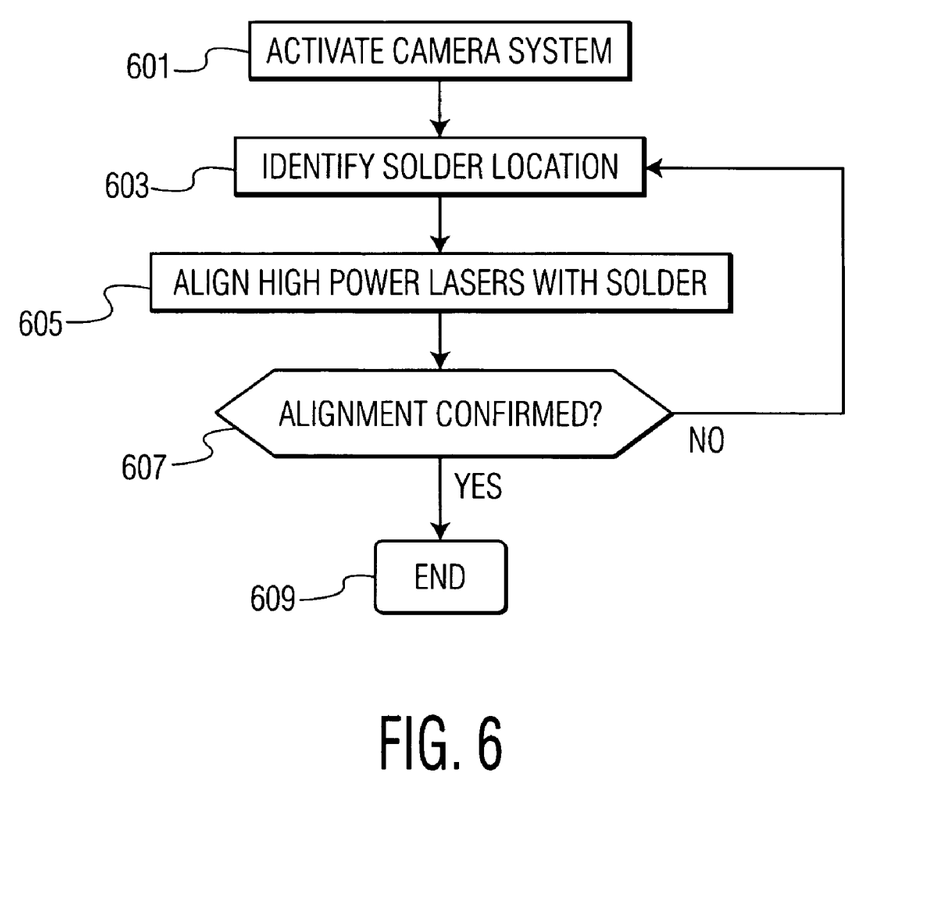
FIG. 6 is a flowchart showing an exemplary method of aligning a high power laser to a solder attachment, according to the present invention.

FIG. 6 is a flow chart showing a method of aligning the high power lasers to the heat sensitive attachment, described above, and using visual alignment with a camera system. Step 601 activates and initializes the camera system, which may be a Powervision System, available from Acuity Imaging, Inc., for example. It is contemplated, however, that any similar vision system may be used. In step 603, by using data obtained by the camera system, a processor or manual operator identifies the location of the heat sensitive attachment, which may be a metal solder, for example. A motion vector may then be generated to move the high power lasers in alignment with the heat sensitive attachment, in step 605. Further data from the camera system may be obtained in step 607 to determine if the high power lasers are within substantial alignment with the heat sensitive attachment. If they are not, the method iterates from step 603. If alignment is confirmed, however, the method ends in step 609. Those skilled in the art will recognize that moving the high power lasers to achieve alignment with the heat sensitive attachment may be alternately performed by moving the package containing the heat sensitive attachment to achieve alignment with the high power lasers.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed:

1. A method of optimizing the alignment of an optical fiber attached to a mount with a heat sensitive attachment to an adjacent optical port of an optical device, the method comprising the steps of:
   aligning one or more high-power heating lasers so that their respective radiation paths are incident on the heat sensitive attachment;
   monitoring alignment quality of the optical fiber to the optical port by obtaining a measure of alignment quality;
   repeatedly activating the one or more high-power lasers according to a predetermined pulse schedule to emit one or more beams along respective radiation paths, the laser pulses causing the optical fiber to permanently shift at least vertically toward a desired position, without physically contacting the optical fiber or the heat sensitive attachment means, until the measure of alignment quality is greater than a predetermined threshold when measured at a desired operating temperature.

2. The method of claim 1, wherein the optical port is an output port and an optical power meter obtains a measure of coupled optical power between the optical fiber and the output port as the measure of alignment quality, and the method further comprises the step of activating the optical device to emit an optical signal from the output port.

3. The method of claim 1, wherein the optical port is an input port and the measure of alignment quality is obtained from one of an output signal of the photodetector and an output signal of circuitry coupled to the photodetector.

4. The method of claim 1, wherein a temperature measuring device obtains a measure of temperature of an area surrounding the heat sensitive attachment as the high-power lasers are activated to control application of laser energy to the heat sensitive attachment.

5. The method of claim 1, wherein the step of aligning the one or more high-power heating lasers includes the step of manually aligning the heat sensitive attachment with respect to the one or more high-power lasers.

6. The method of claim 1, wherein the step of aligning the one or more high-power heating lasers includes the step of moving the one or more high-power heating lasers to a predetermined position with respect to the heat sensitive attachment.

7. The method of claim 1, wherein the step of aligning the one or more high-power heating lasers includes the steps of:
   activating a camera system to identify a location of the heat sensitive attachment with respect to the one or more high-power heating lasers;
   designating a motion vector along which to move laser beams of the one or more high-power heating lasers to the location of the heat sensitive attachment; and
   moving the laser beams of the one or more high-power heating lasers with respect to the heat sensitive attachment according to the motion vector.

8. The method according to claim 1, wherein the predetermined pulse schedule activates the one or more high-power lasers to emit 5-8 bursts of 10-14 pulses of optical energy each, with a pause between each respective burst of between 170 and 280 milliseconds and each pulse having 10-22 watt pulse power and a pulse width of between 22 to 38 milliseconds.

9. A method according to claim 1, wherein the step of repeatedly activating the one or more high-power lasers heats the heat-sensitive attachment to a temperature in a range from 70 degrees Celsius to 110 degrees Celsius and the desired operating temperature is in a range from 20 degrees Celsius to 25 degrees Celsius.

10. A method of thermally adjusting alignment of an optical fiber to a laser diode chip inside a butterfly package, where the optical fiber is attached to a mount with a heat sensitive attachment, the method comprising the steps of:
   a) placing the butterfly package on a surface cooled to a predetermined temperature;
   b) activating the laser diode chip to emit an optical signal;
   c) aligning the package to a plurality of high power lasers so that the heat sensitive attachment is substantially within the respective radiation paths of the plurality of high power lasers;
   d) activating the plurality of high power lasers to emit pulses of optical energy along their respective radiation paths according to a predetermined pulse schedule, the pulses of optical energy causing the optical fiber to permanently shift at least vertically to a desired position without physically contacting the optical fiber or the heat sensitive attachment means;
   e) activating an optical power meter to obtain a measure of alignment quality between the optical fiber and the laser diode chip; and
   f) repeating steps d-e until the measure of alignment quality is greater than a predetermined threshold when measured at a desired operating temperature.

11. The method according to claim 10, wherein the butterfly package includes an internal thermo-electric cooler and the method further comprises the step of deactivating the internal thermo-electric cooler prior to step d.

12. The method of claim 10, wherein the predetermined pulse schedule activates the plurality of high-power heating lasers to emit 5-8 bursts of 10-14 pulses of optical energy each, with a pause between each respective burst of between 170 and 280 milliseconds and each pulse having 10-22 watt pulse power and a pulse width of between 22 to 38 milliseconds.

13. The method of claim 10, wherein the step of aligning the plurality of high-power heating lasers includes the step of manually aligning the heat sensitive attachment with respect to respective beams of the plurality of high-power heating lasers.

14. The method of claim 10, wherein the step of aligning the plurality of high-power heating lasers includes the step of moving the heat sensitive attachment and the plurality of high-power heating lasers to respective positions preestablished as being desirably aligned.

15. The method of claim 10, wherein the step of aligning the plurality of high-power heating lasers includes the steps of:

activating a camera system to identify a location of the heat sensitive attachment with respect to the plurality of high-power heating lasers;

designating a motion vector along which to move beams of the plurality of high-power heating lasers to the location of the heat sensitive attachment; and moving the beams of the plurality of high-power heating lasers with respect to the heat sensitive attachment according to the motion vector.

16. A method of thermally adjusting alignment of an optical fiber to a laser diode chip inside a butterfly package, where the optical fiber is attached to a mount with a heat sensitive attachment, the method comprising the steps of:

a) placing the butterfly package on a surface cooled to a predetermined temperature;

b) aligning the package to a plurality of high power lasers so that the heat sensitive attachment is substantially within the respective radiation paths of the plurality of high power lasers;

c) activating the plurality of high power lasers to emit pulses of optical energy along their respective radiation paths according to a predetermined pulse schedule the pulses of optical energy causing the optical fiber to permanently shift at least vertically to a desired position without physically contacting the optical fiber or the heat sensitive attachment means;

d) activating a temperature measuring device to measure a temperature of the package to control the activation of the high power lasers;

e) obtaining a measure of alignment quality between the optical fiber and the laser diode chip; and f) repeating steps c-e until the measure of alignment quality is greater than a predetermined threshold when measured at a desired operating temperature.

17. The method according to claim 16, wherein the butterfly package includes an internal thermo-electric cooler and the method further comprises the step of deactivating the internal thermo-electric cooler prior to step c) and activating the thermo-electric cooler to bring the package to a desired operating temperature prior to obtaining the measure of alignment quality in step e).

18. The method of claim 16, wherein the predetermined pulse schedule activates the plurality of high-power heating lasers to emit 5-8 bursts of 10-14 pulses of optical energy each, with a pause between each respective burst of between 170 and 280 milliseconds and each pulse having 10-22 watt pulse power and a pulse width of between 22 to 38 milliseconds.

19. The method of claim 16, wherein the step of aligning the plurality of high-power heating lasers includes the step of manually aligning the heat sensitive attachment with respect to the plurality of high-power heating lasers.

20. The method of claim 16, wherein the step of aligning the plurality of high-power heating lasers includes the step of respectively moving the heat sensitive attachment and the plurality of high-power heating lasers to predetermined aligned positions.

21. The method of claim 16, wherein the step of aligning the plurality of high-power heating lasers includes the steps of:

activating a camera system to identify a location of the heat sensitive attachment with respect to the plurality of high-power heating lasers;

designating a motion vector along which to move beams of the plurality of high-power heating lasers to the location of the heat sensitive attachment; and moving the beams of the plurality of high-power heating lasers with respect to the heat sensitive attachment according to the motion vector.

\* \* \* \* \*